United States Patent [19]
Dobrica

[11] Patent Number: 6,070,086
[45] Date of Patent: May 30, 2000

[54] CLOSED LOOP POWER TRANSMITTER POWER CONTROL UNIT FOR A CDMA CELLULAR SYSTEM

[75] Inventor: Vasic Dobrica, Tokyo, Japan

[73] Assignee: NEC Corporation, Japan

[21] Appl. No.: 08/933,535

[22] Filed: Sep. 19, 1997

[30]     Foreign Application Priority Data

Sep. 20, 1996  [JP]  Japan .................................... 8-250351

[51] Int. Cl.[7] .................................................. H04B 7/005
[52] U.S. Cl. .......................... 455/522; 455/67.3; 455/69; 455/88; 370/342
[58] Field of Search ................................. 455/69, 88, 92, 455/522, 63, 277.1, 277.2, 278.1, 561, 67.1, 67.3; 370/335, 342; 375/206, 347, 348

[56]                 References Cited

U.S. PATENT DOCUMENTS

5,570,353  10/1996  Keskitalo et al. ....................... 455/522
5,604,730   2/1997  Tiedemann, Jr. ........................... 455/69
5,727,033   3/1998  Weaver et al. .............................. 455/69

*Primary Examiner*—Reinhard J. Eisenzopf
*Assistant Examiner*—Lester G. Kincaid
*Attorney, Agent, or Firm*—Ostrolenk, Faber, Gerb & Soffen, LLP

[57]                 ABSTRACT

A first EbIo estimator calculates EbIo using samples corresponding to data symbols and samples corresponding to pilot symbols. A diversity combined signal, which is obtained by coherent maximal ratio combining of paths signals is provided for the data symbol hard decisions. The data symbol hard decisions are used in EbIo measurement. The calculation for signal power uses re-modulation. The re-modulation is based on provided carrier signals. The carrier signal is derived using interpolated pilot symbols. The calculation for interference power uses a difference between a received signal and a re-modulated signal. A second EbIo estimator calculates EbIo using only samples corresponding to the pilot symbols. A rough error rate estimation uses the hard decisions for pilot samples and their comparison with known pilot symbols. If an estimated error rate is less than a predetermined threshold, the EbIo measured by first EbIo estimator is used for power control. When the estimated error rate is larger than the threshold, the EbIo measured by second EbIo estimator is used to control the power. The selection between the first and second EbIo estimator is for each slot EbIo measurement. The measured EbIo is compared with the preset EbIo threshold level, and as a result of this comparison, a command to lower or raise power is sent to the mobile station using the return channel.

16 Claims, 4 Drawing Sheets

CLOSED LOOP POWER TRANSMITTER POWER CONTROL UNIT FOR A CDMA CELLULAR SYSTEM

BACKGROUND OF THE INVENTION

The present invention relates to cellular mobile telephone systems. More specifically, the present invention relates to system and method for controlling closed loop transmitter power in a code division multiple access (CDMA) cellular mobile telephone system.

CDMA is a modulation and multiple access technique based on spread spectrum communication that has been applied to improve capacity in digital cellular radio communication systems. Code division multiple access using direct sequence (for convenience, herein called CDMA) is one of several techniques for facilitating communication in which a large number of system users are present. In the CDMA system all the users employ the same code for encoding and decoding of their respective information sequences, the transmitted signals in the common spectrum are distinguished from one another by superimposing a different pseudo-random pattern, also called a code, on each transmitted signal. Thus a particular receiver can receive the transmitted information intended for it by knowing the pseudo-random pattern, i.e., the key used by corresponding transmitter.

The cellular mobile channel typically can be characterized by two separate phenomena, average path loss and fading. The average path loss can be described statically by log-normal distribution whose mean is proportional to inverse fourth-power of the path distance. The second phenomenon has Rayleigh fading characteristic. The Rayleigh fading process is caused by the physical environment, and results in copies of the signal arriving simultaneously from many directions with different transmission delays. This causes significant phase differences between the paths with the possibility for destructive summation, resulting in deep fades. Fading is very disruptive to the channel, which results in poor communications. While Rayleigh fading may be independent for forward (cell-to-mobile) links, log-normal shadowing normally will exhibit reciprocity.

Power control is very important system requirement for a CDMA system, since only by controlling of power of each user resources can be shared equally among users and capacity maximized. In order to maximize the capacity of CDMA system in terms of the number of simultaneous calls in given system bandwidth, the transmitted power of each mobile unit is controlled so that its signal arrives at the cell site with the minimum required signal-to-interference ratio. Power control is essential in any CDMA system in order to mitigate the "near/far problem" preventing users that are geographically closer to the base station from "overpowering" users that are farther away. Furthermore, the nature of fading channels cause power variation that must be compensated if it is possible. To equalize the received powers, a combination of open and closed loop is used. The goal of the open loop is to adjust transmitted power according to changes in received power. For reverse link open loop, the mobile stations measure the received power level from the cell sites and adjust their transmitter power in an indirectly proportional manner, attempting to have all mobile station transmitted signals arrive at the cell with the same nominal power level. The open loop control can cope with the very slow shadow type fading.

For the reverse link closed loop power control, the base station measure the relative received power level or more precisely measures EbIo (the ratio of signal energy per bit to the interference power spectral density, Io) of each of associated mobile station's and compare it to an adjustable threshold. A determination is made to transmit a power-up command or a power-down command to the mobile station. The power adjustment command signals the mobile station to nominally increase or to decrease the mobile station transmit power by a high enough to permit tracking of slow Rayleigh fading, approximately 1000 commands per second. The power adjustment command is sent to a mobile station in the forward channel addressed to the mobile station. The mobile station combines the received adjustment commands with an open loop estimate to obtain the final value for transmit radiated power.

The goal of the closed loop is to provide rapid corrections to the open loop estimate in order to maintain the optimum transmit power. This closed loop correction accommodates gain tolerance and unequal propagation losses between the forward and reverse links. The variations in relative path losses and shadowing effects will generally be slow enough to be controlled. The slow Rayleigh fading could be controlled too, however, the variations associated with Rayleigh fading could be too rapid to be tracked by power control. It is known that the effectiveness of the combination of interleaving and coding in combating the effects of power variation due to slow Rayleigh fading is reduced. At low speeds (slow fading) the power control reacts to compensate for fading. The power control and interleaving/coding are most effective in complementary parameter regions, thus providing a degree of robustness for both fast and slow Rayleigh fading. The closed loop power control is the crucial component to combat slow Rayleigh fading. Another benefit of power control is that each user transmits only as much energy as is required, thus prolonging battery life in portable transmitters.

The BER/FER (bit/frame error rate) performances in a CDMA system are directly related to the closed loop power control efficacy in combating the effects of received power variation. Further, by controlling the power, unnecessary system interference is minimized, increasing overall system capacity. The accuracy of EbIo measurement for the purpose of closed loop power control is essential for CDMA cellular system performance, so that receiver could overcome deleterious fading, providing a required degree of robustness. The EbIo measurement for low signal to interference ratios suffers high degradation and introduces errors in power control. For precise power control accurate and reliable EbIo measurements are required.

In a coherent detection data communication system, the known pilot symbols are usually transmitted with data symbols. In the receiver, the transfer function of channel is estimated using the pilot symbols, and data symbols are detected based on the estimated transfer function. The same pilot symbol is used for EbIo measurements. In order to minimize losses caused by transmission of pilot symbols, the ratio of the transmitted pilot symbols to the transmitted data symbols is usually low, and using only pilot symbols for EbIo measurement could not always satisfy requirements for accurate EbIo measurements.

Assuming that the receiver is working in a region of reasonable symbol errors (slightly less than 0.5), and by introducing data symbols decisions in the process of EbIo measurements, the accuracy of power estimation could be increased resulting in an improvement of closed loop power control performance. It is important that the latency in determining and transmission of power adjustment commands (close loop delay) is minimized, so that channel conditions will not change significantly before the responding of mobile unit. For these reasons we could not use the re-encoding of decoder's output data for EbIo measurement, since the usual long delay due to decoding/deinterleaving is inconsistent with the need for fast power control. The power control command is sent "unprotected" using the forward link for the same reasons.

Therefore, the hard decisions before deinterleaving/decoding with high error rate have to be used for EbIo measurements.

By including data symbols decisions in the process of EbIo measurements, the accuracy of power estimation is increased, resulting in an improvement of closed loop power control performance. The tracking of the received power variation is improved. Also, the receivers' BER performance are improved and deviation of received signal power has been reduced. However, for low EbIo values and due to variation of received power, particularly during deep fades, when the rate of wrong decisions become large, the use of data decisions for EbIo measurement introduces difficulties in controlling the transmitted power and for some conditions leads to the total blocking of the signal. Thus, the using of data symbol decision for EbIo measurement should be controlled and selective.

SUMMARY OF THE INVENTION

It is an object of the present invention to provide a novel and improved method for closed loop power control. The reliability and accuracy of EbIo measurement are essential for closed loop power control.

The object of the present invention is achieved by a closed loop power control unit which is coupled to respective cell-site transmitter/receiver comprising: means for measuring EbIo(the ratio of signal energy per bit to the interference power spectral density), means for generating power adjustment commands corresponding to deviation in corresponding cell-site EbIo measurement a predetermined EbIo level; and wherein the coherent detection schemes are used for reverse link (mobile to cell) in said cellular mobile telephone system and wherein it is assumed that the mobile station is capable of receiving said power adjustment commands and adjust transmission signal power in correspondence to said power adjustment commands.

The EbIo measurement is extended to include data symbols decision. The data symbols and pilot symbols are divided to power control groups or slots. Based on EbIo measurement during one slot, the power up or power down command is sent to the mobile station. The carrier signal is estimated for each received path using interpolated pilot symbols. Estimations are used for coherent diversity combining and detection in a RAKE receiver architecture. Also, the diversity combined signal is used for hard decision symbols decisions for the purpose of EbIo measurement. The re-modulation (interpolated reference) is calculated based on estimated carriers and data decisions. The interference power is calculated by using difference between received signal and re-modulated signal. Having estimates of signal power and interference power, the calculation for Eb and Io is straight forward.

EbIo is also measured using only pilot symbols. A rough estimation of data decision errors is done for each slot based on hard decisions for pilot samples and their comparisons with the known pilot symbols. When such short term estimated error rate is less than a threshold, the data decisions are used for EbIo measurement of that slot, and if the estimated error rate is larger than a threshold, only pilot symbols are used for EbIo measurements. The power control performances are improved with the proposed selective and controlled usage of data decisions for EbIo measurements.

When the receiver is working in a region of reasonable symbol errors, the accuracy and reliability of EbIo estimates are improved by using data symbols decisions for measurements. The power is controlled so that the value of desired EbIo to be used for each mobile station is based on the error rate performance. However, for low received EbIo values, during a sudden degradation or deep fades, when the rate of wrong decisions become large, the use of data decisions for EbIo measurements in all slots introduces difficulties in controlling the transmitted power, and for some conditions leads to total signal blocking. When the number of data symbol errors is large in a particular slot, it is better to use only pilot symbols for EbIo measurements of that slot. In the present invention, a rough error rate estimation is proposed. The rough error rate estimation is based on hard decisions for pilot samples and their comparison with the known pilot symbols. When such estimated error rate is larger than a threshold, only pilot symbols are used for EbIo measurement in that slot.

With the proposed selective usage of data decisions for EbIo measurement, power control error performances are improved, and control of power is easier than in the case when data decisions are used for all slots. No blocking of transmitted signal for low EbIo values or high diversity orders.

In a CDMA cellular mobile system, the capacity can be maximized if the transmitter power is controlled such that each transmitted signal arrives with a minimal signal to interference ratio which allows acceptable data recovery performance. If the received power is too high, the performance of that mobile station is acceptable, but interference to all the other mobile station that sharing the channel is increased, and may result in unacceptable performance to other users. Furthermore, the nature of fading channel causes power variations that must be compensated as much as possible, particularly for slow Rayleigh fading, where coding/interleaving is less efficient. To equalize the received powers, the combination of closed and open loop transmitter power control is usually used. The closed loop power control is the essential component to combat slow Rayleigh fading.

Therefore, the present invention overcomes deleterious fading, and decreases unnecessary system interference which effects the overall system capacity.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Coherent detection schemes are superior compared to differentially coherent or non-coherent schemes in terms of power efficiency. However, carrier recovery, which is necessary for coherent detection, suffers from the time-variant nature of fading channels. The power efficiency provided by coherent detection in digital communication systems is only possible when the receiver is supplemented by a carrier synchronization unit. Rapid fading is a central problem in digital mobile communications. Due to implementation considerations and the lack of a robust phase estimation algorithm, differentially coherent detection or other non-coherent techniques have historically been used in fading channels. Significant performance improvements can be achieved if near coherent demodulation is achieved. Linear modulation schemes such as M-PSK or M-QAS which employ coherent reception potentially from highly favorable communications schemes. The power advantage of coherent detection over non-coherent detection remains or is actually enhanced when channel coding or co-channel interference are considered. When the channel is corrupted by Rayleigh fading, resulting in rapidly varying channel phase, an efficient carrier synchronization unit which derives carrier signal from the receive signal is essential for successful detection.

Figure 1:
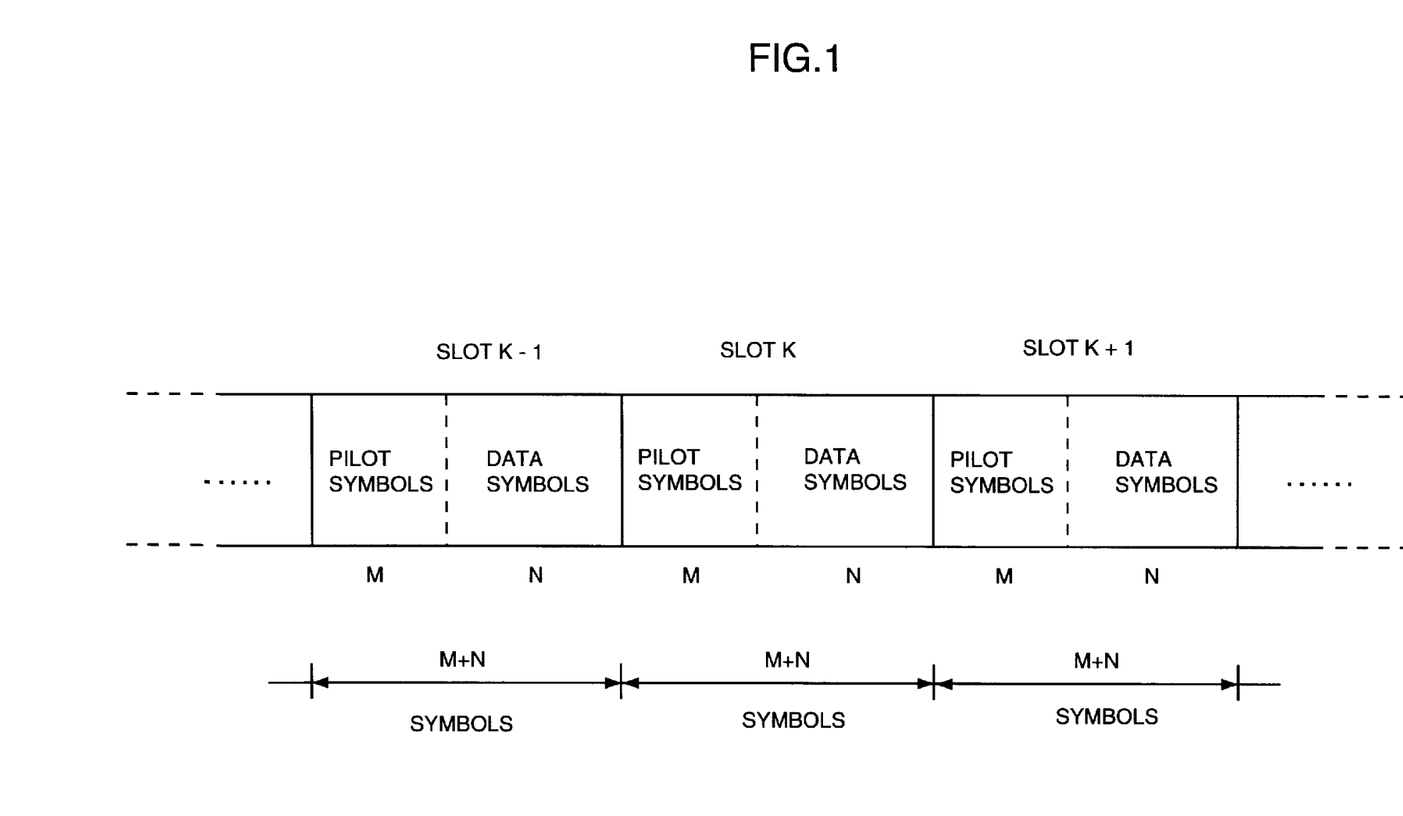
FIG. 1 illustrates the frame structure of transmission scheme.

The transmitter periodically inserts known symbols, pilot symbols, which the receiver uses to extract samples corresponding to the pilot symbols, and interpolates them to form an estimate of the fading channel multiplicative distortion. These pilot symbols are used in closed loop power control processing for EbIo measurement. This frame structured transmission is illustrated in FIG. 1. The transmitter sends M pilot symbols, then N data symbols, then M new pilot symbols and so on. N/M ratios higher than 15 can be used, so the loss due to the known symbol insertion can be neglected. The number of pilot symbols per frame (slot), M, usually is 1 to 5. When the number M is greater than 1, samples corresponding to the pilot symbol from one slot, should be accumulated and average. By averaging the samples, the effect of additive noise or the effect of interference has been greatly reduced. Usage of these average samples for interpolation improves performance of pilot symbol interpolation scheme. Ordinary pilot symbol interpolation is well known in the prior art for carrier recovery, and in the present invention it is used for illustration, however, the other digital techniques for carrier estimation could be applied too. Diversity reception and maximal ratio combining can be easily implemented using carrier synchronization unit, since this unit delivers the optimal estimates of channel gain. The carrier signal which is derived from interpolated pilot symbols could be easily used for EbIo measurement. In present invention it is assumed that EbIo is measured during one slot interval, and the power control commands are sent to mobile unit to adjust transmitted power once per slot. In some cases it is better to insert additional pilot symbols into the middle of the slot in order to improve carrier estimation. The present invention could be applied in such cases.

Figure 2:
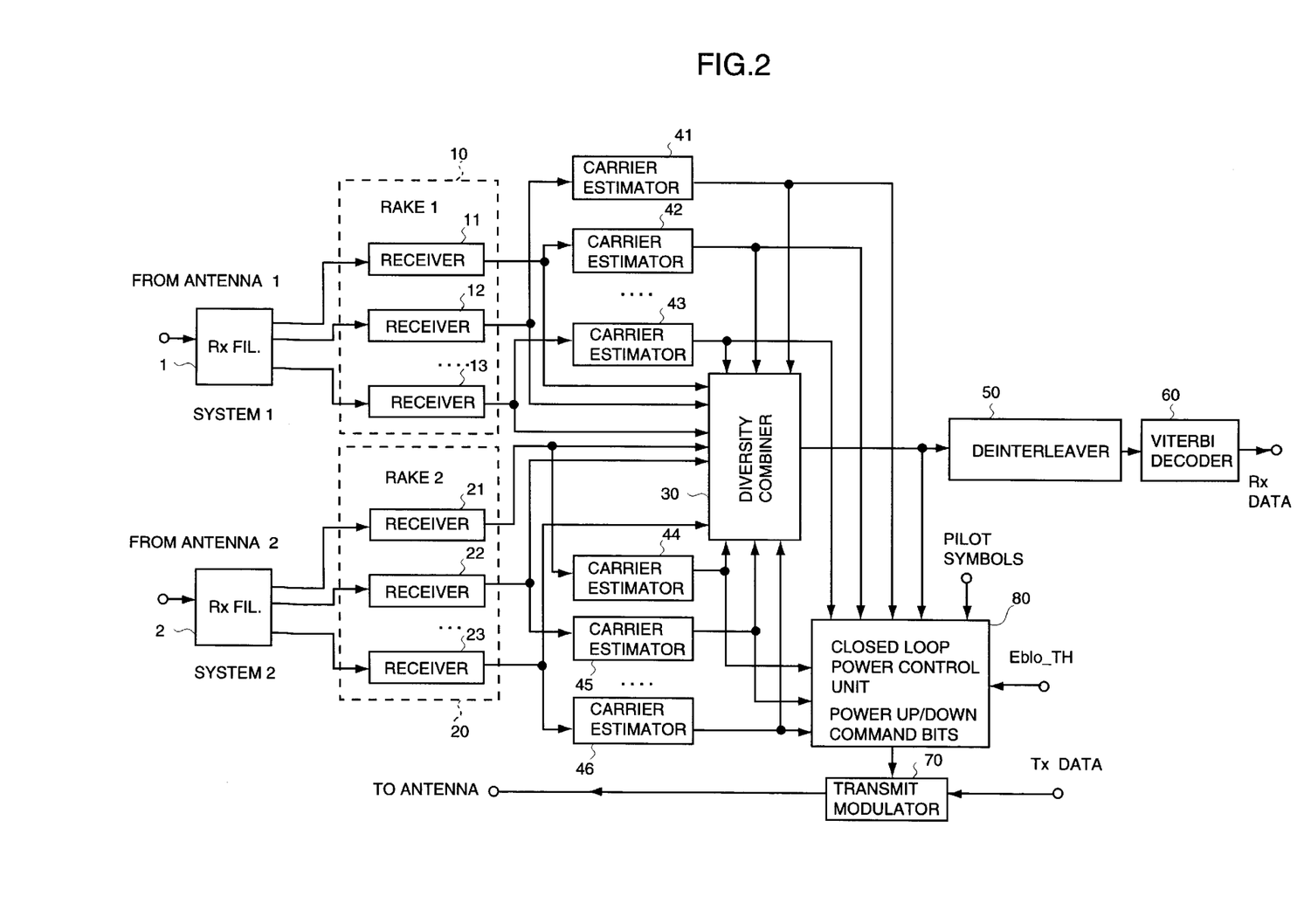
FIG. 2 is a general block diagram of the CDMA receiver/transmitter.

Before the detailed description of the proposed method for closed loop power control and EbIo measurement, we will briefly describe, referring to FIG. 2, the position and the purpose of closed loop power control unit. FIG. 2 is block diagram of one receiver/transmitter in a cell-site with particular reference to the power control feature of the present invention. The receiver/transmitter in FIG. 2 is used in communications with one particular mobile station. FIG. 2 illustrates a general block diagram of CDMA receiver which employs diversity combining, coherent detection, de-interleaving and soft decision Viterbi decoding. FIG. 2 presents the main based band processing. The processing at RF and IF frequencies, up/down conversion, timing recovery, as well as some other functions, are not illustrated. In FIG. 2, diversity reception is employed with two separate antennas and two independent received systems. Numerals 1 and 2 are receiver filters. Each receiver system uses a RAKE receiver allowing signals arriving with different propagation delays to be received separately and combined, RAKE 10 and RAKE 20 in FIG. 2. The each path receiver (RAKE fingers 11–13 and 21–23) implements de-spreading processing. For each path, the carrier estimator (numerals 41–46) derives phase & amplitude from the received signal, using known pilot symbols. Each carrier estimator 41–46 interpolates the channel measurements provided by the pilot symbols to obtain the carrier reference for detection and EbIo measurements. Diversity reception and maximal ratio combining is implemented by diversity combiner 30. The diversity combiner 30 coherently combines path signals in the sense to maximize the signal to interference ratio. The output of diversity combiner 30 is provided an input to de-interleaver 50 and closed loop power control unit 80. The soft decision Viterbi decoder 60 is utilized to determine the most likely information sequence.

The closed loop power control unit 80 measures the EbIo in the received signal from particular mobile unit. In response to the measured EbIo level, a power adjustment command is generated which is provided as an input to transmit modulator 70. As previously described, the bit in power adjustment command are used by related mobile station in adjusting mobile station transmitter power. The power adjustment command signals the mobile station to nominally increase or to decrease power by a predetermined amount (step size) of approximately 1.0 dB.

The closed loop power control unit 80 uses: estimated carrier signals for each path, output signal from diversity combiner 30, and known pilot symbols to measure EbIo. When the received EbIo measurement is less than a preset level provided by a cell-site processor (not shown), the power command bits are generated and indicate that an increase in mobile station transmitter power is necessary. Similarly, if the received measurement is greater than the preset level, the power adjustment command is generated such that the mobile station transmitter power is reduced. Transmit modulator 70 spread spectrum modulates the user addressable information signal for transmission to particular mobile station. Transmit modulator 70 also receives the power adjustment command bits from closed loop power control unit 80 and also spread spectrum modulates these bits for transmission to the mobile station.

Signal power measurement and interference power measurement using received pilot symbols during one pilot interval of M samples could be realized by accumulation and averaging. An assumption is made that the fading multiplicative distortion is constant over a pilot interval of M symbols. First, the modulation is removed by appropriate rotation of received samples. For the rotation of received samples, the known pilot symbols are used. By the rotation, all pilot symbols vectors are arranged in the same direction for accumulation and averaging. A mean is calculated by averaging. The power of such calculated mean is an estimate of signal power interference power measurement by using the difference between the rotated received signal and the calculated mean.

Further explanation for EbIo measurement by using accumulation and averaging of pilot samples is given below. The complex-valued baseband linearly modulated received signal (r1, r2, . . . rM) could be written in the form as follows:

$r1 = c1\ a1 + n1$ r2=c2 a2+n2

. . .

rM=cM aM+nM where
- (c1, c2, . . . , cM) is carrier signal,
- (n1, n2, . . . , nM) is interference signal (including and noise),
- (a1, a2, . . . , aM) pilot symbols, and M is number of samples (pilot symbols).

All signals are complex-valued with in-phase and quadrature (I/Q) components.

After proper rotation we have r1_R=c1+n1 a1* r2_R=c2+n2 a2*

. . .

rM_R=cM+nM aM* where * is used for complex conjugation, and where a1 a2*=a2 a2*= . . . =aM aM*=1, i.e., assuming M-PSK modulation.

By averaging a mean is calculated as

Mean=(1/M)(r1_R+r2_R+ . . . +rM_R)

The estimated signal power S is

S=Mean Mean* and the estimated interference power I is

I=(1/M) {(r1_R−Mean)(r1_R−Mean)*+ . . . +(rM_R−Mean)(rM_R−Mean)* }

Using estimated power S and estimated interference power I, the calculation for EbIo is straight forward.

The measurement error is smaller when the number of pilot symbols is larger. However, the number of pilot symbols is limited in order to minimize the loss for their transmission. For constant carrier, an unreal condition used here only for this temporary analysis, the long term average of measured signal power, S_ave, is S_ave=S_real+(1/M) I_p where S_real is average signal power, and I_p is average interference power.

Similar, the long term average of measured interference power. I_ave, is

I_ave=[ (M−1)/M] I_p

The long term average of measured power is different from real power. This deviation from real power causes an error in controlled EbIo, so that the mean of EbIo will differ from the EbIo threshold. Also, the measurement error causes an imprecise command to be sent for transmitter power adjustment. The accuracy of the measured interference power could be increased by using leaky integration or by averaging interference power over few slots. The averaging/integration is required only when the number of samples for estimation is small, as the case is when we use only pilot symbols for measurements. There is no averaging for estimated signal power in order to track and compensate received power variation caused by fading. To decrease power measurement error it is needed to increase the number of samples by including data symbols for power measurements.

Diversity combining is the favored approach to mitigate fading. There are two ways that could be applied for EbIo measurements in diversity combining: measure EbIo for diversity combined signal, or measure Eb and each path separately and then add/average to estimate total EbIo. In the first method, the measurement using the diversity combined signal is better for real condition, where the EbIo is low and the number of paths is changing dynamically. The relationship between EbIo of the combined signal and BER is less dependent on the path conditions. For all these reasons the measurement using the diversity combined signal is applied to both methods.

The second method for power measurement based on accumulation and averaging of pilot symbols, which is described above, could be applied to diversity combing. In the diversity combining case, first the fading distortion is compensated for each path with inherent maximum ratio combining, and path signals are coherently combined. Then, assuming that fading multiplicative distortion is constant over a interval of M pilot symbols, the samples of combined signal are rotated to remove modulation and then the power is estimated in the similar way as described above. Although the weighting introduces variation in the interference signal power, the averaging/integration of interference power over few slots is still possible. The interference signal power could be estimated from the sum of path powers and S/I derived from combined signal. In this way calculated interference power is not effected by weighting and it could be averaged/integrated over a few slots. The accuracy of interference power measurement is improved with an integration/averaging, and benefit of using diversity combined signal for power control remains.

The second EbIo measurement is based on carrier signal as follows. Using the similar notation as above we have
- (r1, r2, . . . rM) is received modulated signal,
- (p1, p2, . . . pM) is carrier signal which is derived from interpolating pilot symbols.
- (d1, d2, . . . dM) are the know pilot symbols.

The signal power is estimated using re-modulated signal (p1d1, p2d2, . . . pMdM).

The interference power is estimated using the difference between received signal and re-modulated signal, (i1, i2, . . . , iM), where i1=r1-p1d1, i2=r2-p2d2

. . .

iM=rM-pMdM

The interference power is estimated by power of (i1, i2, . . . , iM).

The EbIo measurement based accumulation of pilot symbols has almost the same performance as the EbIo measurement using re-modulation, when carrier signal estimation is based on pilot symbols accumulation and linear interpolation. The accumulation for EbIo estimation and carrier estimation are similar.

To further include data symbols in EbIo measurement the carrier signal is required, because the fading multiplicative distortion could not be further considered constant over the measurement period. When the data symbols are included in the measurement, the method for EbIo measurement is similar as the last method which is based on demodulation and described above. The signal power estimation is accomplished using interpolated reference (re-modulated signal). Interference power estimation uses the difference between the received signal and the re-modulated signal. K is total number of symbols in one slot, i.e., K=M+N. EbIo estimation uses k samples, M samples corresponding to M pilot symbols and N sample corresponding to N data symbols.

Using similar notation as above we have:

Assuming (r1, r2, . . . rK) as received modulated signal, where (r1, r2, . . . rM) are corresponding to data symbols, and (rN+1, . . . , rK) are corresponding to pilot symbols (p1, p2, . . . pK) as carrier signal which is derived from interpolating pilot symbols.

Hard decision data (d1, d2, . . . dN) are obtained using (r1, . . . , rN) and (p1, . . . , pN).

The pilot symbols (dN+1, dN+2, . . . , dK) are known, however, we could make decisions using samples (rN, rN+1, . . . , rK), and then compare these decisions with know pilot symbols (dN+1, dN+2, . . . , dK) for a rough error estimation. The interference signal (i1, i2, . . . iK) will be i1=r1−p1d1,
i2=r2−p2d2
. . .
iK=rK−pKdK The re-modulated signal is (p1d1, p2e2, . . . , pNdN, . . . , pKdK)

The signal power is estimated by the power of the re-modulated signal.

The interference power is estimated by the power of (i1, i2, . . . , iK).

The method above is for single path case. The extension for diversity combining follows. Using the similar notation and assuming only two paths (a and b) we have:

first path (a)
  (r1a, r2a, . . . rKa) received modulated signal,
  (p1a, p2a, . . . pKa) carrier signal which is derived from interpolating pilot symbols,
second path (b)
  (r1b, r2b, . . . rKb) received modulated signal,
  (p1b, p2b, . . . pKb) carrier signal which is derived from interpolating pilot symbols.

The received signal after diversity combining and weighting for maximum ratio combining,(r1c, r2c, . . . rKc), is r1c=r1a p1a+r1b p1b
r2c=r2a p2a+r2b p2b
. . .
rKc=rKa pKa+rKb pKb Hard decision data (d1, d2, . . . dN) is obtained using (r1c, r2c, . . . rNc).

If the carrier estimation is perfect and no hard decision errors, the interference signal (i1, i2, . . . , iK) will be i1=r1c−m1
i2=r2c−m2
. . .
iK=rKc−mK Where (r1c, r2c, . . . , rKc) is diversity combined signal as it is defined above, and (m1, m2, . . . , mK) is an estimate of diversity combined signal (thecombination of re-modulated and weighed signals). The estimate of diversity combined signal (m1, m2, . . . , m) is calculated in following way.

m1=p1a d1 p1a+p1b d1 p1b
m2=p2a d2 p2a+p2b d2 p2b
. . .
mK=pKa dK pKa+pKb dK pKb

The interference power is estimated by the power of (i1, i2, . . . , iK). The signal power S is estimated by using of (m1, m2, . . . , mK).

The signal to interference ration S/I is calculated as $$S/I = (m1\,m1^* + m2\,m2^* + \ldots mK\,mK^*)/\{(r1c-m1)(r1c-m1)^* + (r2c-m2)(r2c-m2)^* + \ldots + (rKc-mK)(rKc-mK)^*\},$$

where denominator is=(r1c d1*−(p1ae* p1ae+p1be p1be*))(r1c d1*−(p1ae p1ae*+p1be p1be*))*+ . . . ) and where, d1 d1*=d2 d2*= . . . =dK dK*=1

EbIo is calculated from S/I.

Generalization for high orders of diversity is straight forward. There are two vain reasons for EbIo measurement error using this method: the estimation error in the process of carrier recovery and the estimation error caused by data decision errors. The advantage of this method is that the number of samples is increased. When the power is controlled so that the receiver is working in a region of reasonable symbol errors, the increase in the number of samples significantly extenuates EbIo measurement error.

Figure 3:
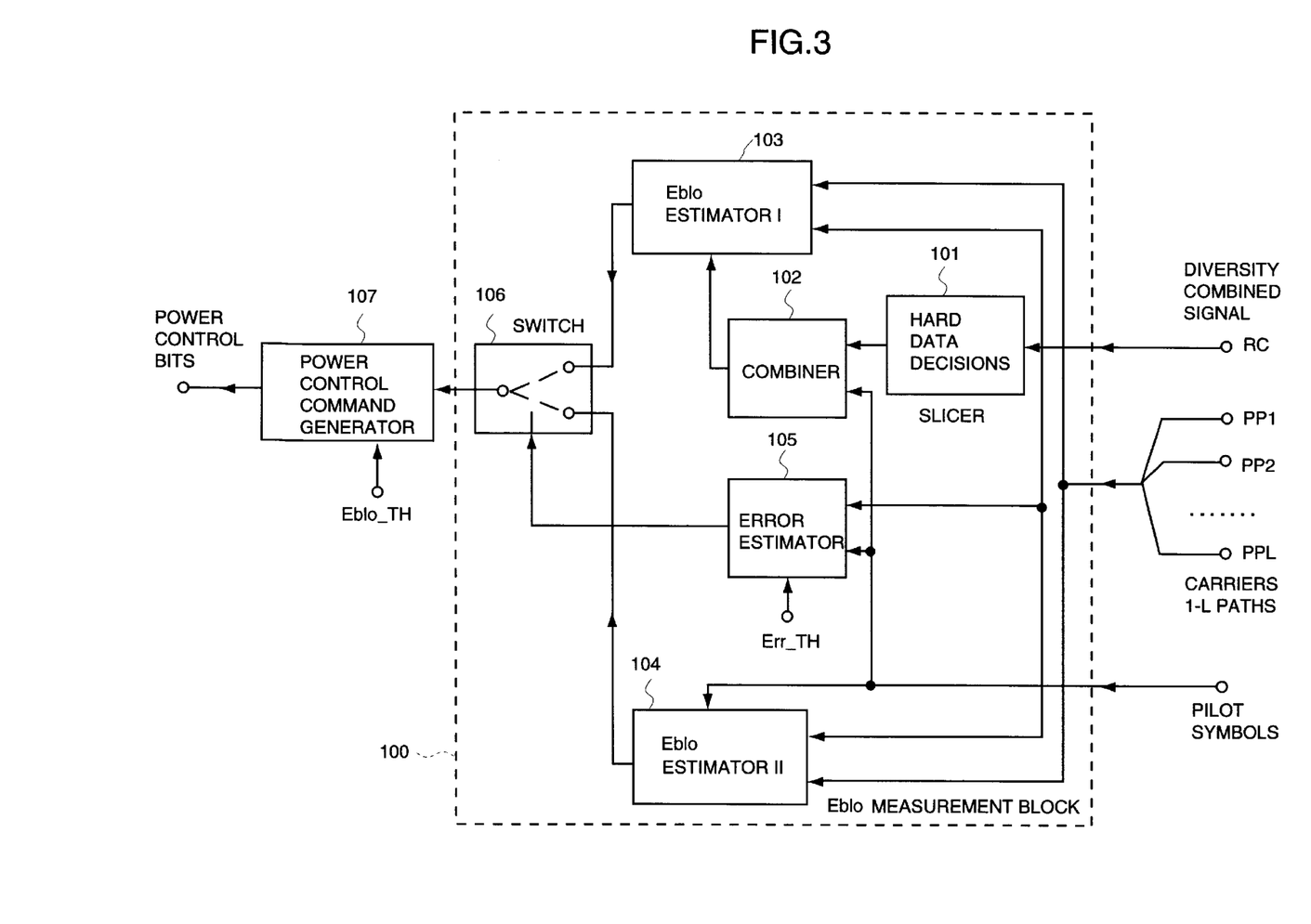
FIG. 3 is an exemplary block diagram of closed loop power control unit.

FIG. 3 illustrates the processing for the EbIo measurement and closed loop power control generation. This figure is a detailed illustration of the closed loop power control unit 80 in the FIG. 2. The closed loop power control unit uses as inputs diversity combined signal, which is provided by diversity combiner, carrier signals provided by carrier estimators and pilot symbols. The carrier signal for each path in applied Rake receiver is provided to the closed loop power control unit by carrier estimator.

Power control units 80 comprising EbIo measurement block 100 and power control command generator 107. The diversity combined signal, which is obtained by coherently combining path signals in the sense to maximize signal to interference ratio, is used for hard data symbol decisions by slicer 101 for the purpose of EbIo measurement. Combiner 102, combines such hard detected symbols with the known pilot symbols, for the purpose of EbIo estimation in block 103. The EbIo estimator I, numeral 103, calculates EbIo using the samples corresponding to data symbols and the samples corresponding to pilot symbols. The calculation for signal power is made by using the re-modulated signal. The calculation for interference power is made by using the difference between the received signal and the re-modulated signal.

The EbIo estimator II, numeral 104, measures using only samples corresponding to the pilot symbols. Both methods for EbIo measurement could be applied in EbIo estimator II: EbIo measurement using accumulation and averaging of pilot samples, or EbIo measurement using re-modulated signals. The performance of these two methods for interpolation as previously described are almost the same, so it is better to use the second method based on re-modulation. For the second method, the intermediate results of calculation for EbIo estimator I, can be used to speed-up the computation for EbIo estimator II. By sharing the computation between the estimators a reduction in the computation can be accomplished. The saving in computation for the first method is possible in the case of joint processing for carrier estimation and EbIo measurement. The EbIo estimator II averages/integrates estimated interference power over a few slots in order to increase the reliability of the Io estimation. By this averaging, the deviation of measured interference power is reduced. The long term average error in Io measurement is dependent on the number of samples used for measurement and it is not the same for EbIo estimator I and II, as it is described previously. The simple correction is done by multiplying the measured interference power by EbIo estimator II with a constant factor. With this simple correction, the two estimators 103, 104 are equalized, and the received EbIo is controlled to be the same for both EbIo estimators 103, 104.

When data symbol decisions are rare, the accuracy of EbIo measured by block 103 is much better than the accuracy of EbIo measured by block 104. However, when the rate of wrong decisions is large, the accuracy of EbIo measured by block 104 is better. The rough error rate estimation is based on hard decisions for pilot samples and the comparison with the known pilot symbols for the last two pilot symbols group, by the error rate estimator 105. The error rate estimator 105 controls switch 106. If the short term estimated error rate is less the error threshold, Err-TH, the measured EbIo by EbIo estimator I, block 103, is used for power control. In the case that the estimated error rate is larger than the error threshold, the EbIo measured by EbIo estimator II, block 104, is used to control power for that slot. The selected EbIo is provided by output of switch 106 to the power control command generator 107. The power control command generator 107, compares the selected EbIo with the preset threshold for desired EbIo, EbIo_TH, setby control processor (not shown), and based on this comparison generates power control bits to command the mobile station to lower or raise its power. The power control bits are combined with the data in transmit modulator and sent the mobile station.

Figure 4:
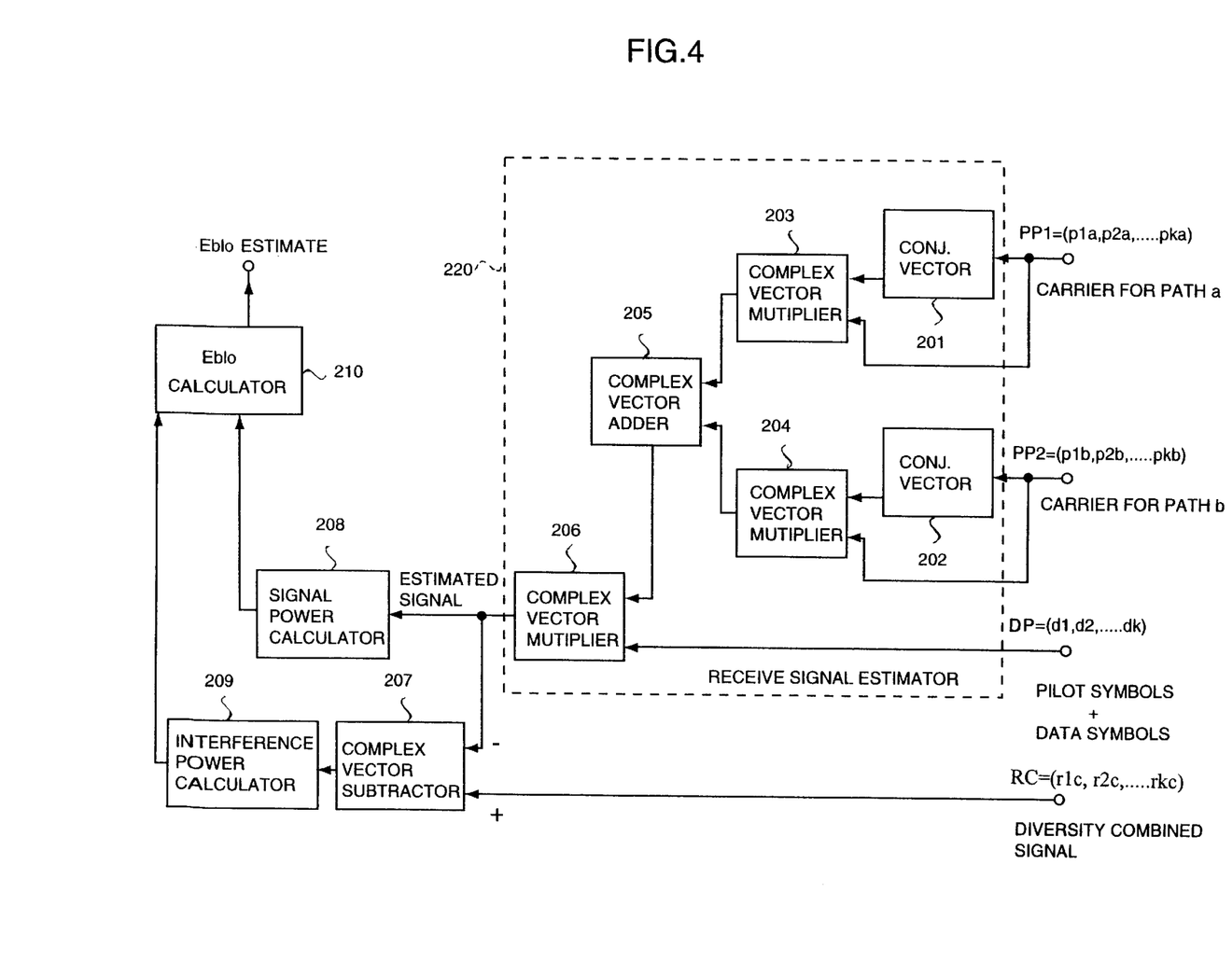
FIG. 4 illustrates in details the processing for EbIo measurement.

The detail of the processing for EbIo estimator I, numeral 103 in FIG. 3, is illustrated by FIG. 4. This Figure illustrates the calculation for two paths diversity combining, and the extension for higher diversity orders is straight forward. The input complex vectors are: diversity combined signal RC= (r1c, r2c, ..., rKc) combine vector of data and pilot symbols DP=(d1, d2, ..., dK), and carrier estimated vectors PP1=(p1a, p2a, ... pKa) and PP2=(p1b, p2b, ... pKb). The blocks 201 and 202 perform the conjugation operation on a complex vector. The blocks 203, 204 and 206 perform pointwise multiplication of the complex input vectors. The block 205 adds the two complex vectors. The block 207 performs a pointwise subtraction of two complex vectors. An estimation of received diversity combined signal is performed in following way: first symbols vector DP is multiplied with the carrier to form re-modulated signal for each path, then the re-modulated signals are multiplied by complex conjugated carrier for weighting each path, and finally the two path signals are added. This calculation for the estimation of received signal is illustrated by receive signal estimator 220. The receive signal estimator 220 comprising blocks 201,202,203,204,205 and 206, where the order of some of the calculations can be changed without effecting the final result. Block 208 calculates signal power using such estimated signal. The difference between diversity combined signal and estimated received signal is calculated by block 207. Using that difference, block 209 calculates interference power. Based on the calculated signal power and the calculated interference power, block 210 calculates EbIo. The calculation for EbIo in FIG. 4 is illustrated by using complex vectors, however some of intermediate vectors are real, thus a decrease in computation is possible.

Similar processing is applied and for EbIo estimator II, numeral 104 in FIG. 3, with the exception that only M samples corresponding to pilot symbols are used for processing. The proposed EbIo measurement is well suited for digital implementation, as it meets the all digital realization requirements.

In the present invention the novel and improved method for EbIo measurement is proposed. The accuracy of EbIo measurement is improved. With the proposed method, precise power control is achieved, resulting in an improvement of receiver BER/FER performance and in a decrease of received power, i.e., a decrease of power control error.

The proposed method enables an increase of number in the samples for EbIo measurement by including data symbols. For a large number of samples, the accuracy of EbIo measurement is improved, resulting in an improvement of closed loop power control performance. The closed loop power control unit uses signal carrier estimates, provided by carrier synchronization unit with no additional cost.

With the proposed selective usage of data decisions in EbIo measurement, the control of power in more precise than it is the case when the data decisions are used for the measurements in all slots. There is no blocking of transmitted signal for low EbIo values or high diversity orders. The selective usage of data decisions stabilizes power control loop.

For low received EbIo values, during a sudden degradation or deep fades, the number of wrong data decisions in one slot becomes large, and the usage of such erroneous data decisions causes high degradation in measurement.

The proposed error estimation detects slots with a large number of data decision errors and the data decisions are not included in EbIo measurement for such slots. In this way the benefit of data symbols is preserved, without high degradation when the number of wrong data decisions in one slot becomes large.

The entire disclosure of Japanese Patent Application No. 8-250351 filed on Sep. 20, 1996 including specification, claims, drawing and summary are incorporated herein by reference in its entirety.

What is claimed is:

1. In a cellular mobile telephone system in which system users communicate information signals between one another using code division multiple access spread spectrum communication signals, a closed loop power control unit which is coupled to respective cell-site transmitter/receiver, the closed loop power control unit comprising:

means for measuring EbIo (the ratio of signal energy per bit to the interference power spectral density) wherein said means for measuring EbIo further comprises:
means for hard-deciding data,
first estimation means for estimating EbIo based on data symbols and pilot symbols,
second estimation means for estimating EbIo based on said pilot symbols,
means for estimating error rate, and
means for selecting an output of one of said first estimation means and said second estimation means based upon an output of said means for estimating error rate,
wherein inserted known symbols and/or pilot symbols are used for estimating carrier and estimating EbIo; and means for generating power adjustment commands corresponding to a deviation in the measured EbIo from a predetermined EbIo level, wherein coherent detection schemes are used for reverse link (mobile to cell) in said cellular mobile telephone system, and wherein a mobile station is capable of receiving said power adjustment commands and adjusting its transmission signal power in correspondence to said power adjustment commands.

2. The closed loop power control unit of claim 1, wherein said means for hard-deciding data further comprises means operatively coupled to an input provided from a receiver's diversity combiner unit, for hard-deciding data based on a diversity combined signal, for coherent combining so that coherent combining is such to maximize the signal to interference ratio and for providing said hard decision to said first means for estimating EbIo.

3. The closed loop power control unit of claim 1, wherein said first estimation means further comprises:

means for estimating receive signal;
means for estimating interference signal;
means for calculating signal power;

means for calculating interference power; and means for calculating EbIo, wherein samples corresponding to data symbols and samples corresponding to pilot symbols are used for EbIo measurement.

4. The closed loop power control unit of claim 3, wherein said control unit receives path signals for a plurality of carrier signals, wherein said means for estimating receive signal further comprises:

means for forming a re-modulated signal (interpolated reference) for each path signal from said carrier signals, said hard decision and said pilot symbols;

means for weighting each of said re-modulated signals using respective ones of said carrier signals and for providing the weighted signal estimate for each path; and means for combining said weighted signal estimates and providing an estimate for received diversity combined signal.

5. The closed loop power control unit of claim 3, wherein said means for estimating interference signal further comprises means for calculating a difference between an estimated diversity combined signal and a received diversity combined signal and for providing an estimated interference signal.

6. The closed loop power control unit of claim 3, wherein said means for calculating signal power further comprises means for calculating signal power using an estimate of a received diversity combined signal.

7. The closed loop power control unit of claim 3, wherein said means for calculating interference power further comprises means for calculating interference power using an estimate of interference signal.

8. The closed loop power control unit of claim 3, wherein said means for calculating EbIo further comprises means for calculating EbIo using a signal power of an estimate of a received diversity combined signal and interference power of an estimate of an interference signal.

9. The closed loop power control unit of claim 1, wherein said first estimation means further comprises means for estimating EbIo based on a number of samples which is larger than a number of samples used in said second estimation means.

10. The closed loop power control unit of claim 9, wherein said second estimation means further comprises means for calculating the leaky integration or the average between the slots for the interference power, wherein a measured interference power deviation is reduced by integration or averaging.

11. The closed loop power control unit of claim 9, wherein said second estimation means further comprises means for compensating long term average measurement error in the interference power by multiplying said measured interference power with a constant factor.

12. The closed loop power control unit of claim 1, wherein said second estimation means uses measurements of accumulation and average of pilot symbols and said first estimation means uses measurements using re-modulated signals.

13. The closed loop power control unit of claim 1, wherein said means for estimating error rate further comprises means for estimating a rough error rate of said means for hard deciding data by comparing the pilot samples with the known pilot symbols.

14. The closed loop power control unit of claim 13, wherein said means for selecting further comprises means for selecting one of said first estimation means and said second estimation means based on the rough error estimation and for using said selected estimation means during one slot period.

15. The closed loop power control unit of claim 14, wherein said means for selecting further comprises:

means for comparing the estimated error rate with a predetermined error, threshold, means for controlling power of the slot based on the EbIo measured by said first estimation means when a short term estimated error rate is less than said error threshold; and means for controlling power of the slot based on the EbIo measured by said second estimation means when short term estimated error rate is larger than said error threshold.

16. The closed loop power control unit of claim 1, wherein said means for generating power adjustment commands further comprises means operatively coupled to said means for measuring EbIo for generating power control bits for transmission power of a mobile station based on a selected EbIo estimation from said first estimation means and said second estimation means.

* * * * *